April 8, 1969

A. MUSHINSKY 3,437,816

ENERGY CORRELATOR EMPLOYING CROSSED ENDLESS
BELTS WITH SLITS THEREIN

Filed Dec. 14, 1966

INVENTOR
Albert Mushinsky

BY S. A. Giarratana +
K. A. Ohralik
ATTORNEYS

April 8, 1969

A. MUSHINSKY 3,437,816

ENERGY CORRELATOR EMPLOYING CROSSED ENDLESS
BELTS WITH SLITS THEREIN

Filed Dec. 14, 1966

INVENTOR
Albert Mushinsky
BY S. A. Giarratana &
K. A. Ohralik
ATTORNEYS

United States Patent Office 3,437,816
Patented Apr. 8, 1969

3,437,816
ENERGY CORRELATOR EMPLOYING CROSSED ENDLESS BELTS WITH SLITS THEREIN
Albert Mushinsky, Framingham, Mass., assignor to General Precision Inc., Little Falls, N.J., a corporation of Delaware
Filed Dec. 14, 1966, Ser. No. 601,677
Int. Cl. H01j 3/14
U.S. Cl. 250—206      6 Claims

ABSTRACT OF THE DISCLOSURE

This patent specification discloses an energy correlator comprising a pair of tapes in the form of crossed endless belts driven in synchronism by a synchronous motor. The belts are provided with slits which alternately scan a focal plane at right angles to one another. A photodetector is positioned adjacent to the intersection of the tapes to receive light passing through the slits from the scanned focal plane. The photodetector produces pulses the time of occurrence of which represent the X and Y coordinates of a point of light in the focal plane. Converters are provided to produce amplitude modulated pulses representing the X and Y coordinates of the point of light.

---

The present invention relates to an energy correlator, and more particularly, relates to an energy correlator which operates on the basis of the focal plane shutter principle.

The purpose of an energy correlator is to automatically track a radiant energy source, which appears in a plane. The correlator will track the motion of the energy source in a plane for the purpose of recording it, displaying it or servoing it, the specific function depending upon system requirements.

Correlators of the prior art have included optical devices which are moved through a variety of scan patterns, until an optical lens in the device focuses on the light source at a single point. Movement of the light source thereafter activates the movement of the optical lens to keep it focused on the single point. If, however, the source is lost, the scan patterns must again be used to locate the target source. As can be appreciated by one skilled in the art, such devices require elaborate search and track circuits with correlation and filtering circuits to compensate for the many system variables. Moreover, since a slit is usually employed to block all background light, both the width and shape of the slit represent a critical factor in the ability of the device to acquire and hold a light source target.

It is accordingly one object of the present invention to provide an energy correlator whose components are both simple and inexpensive.

It is a further object of the present invention to provide an energy correlator in which physical limitations on tolerance will not distract from the accuracy of the device.

It is another object of the present invention to provide an energy correlator which scans an entire area in one simple motion.

It is still another object of the present invention to provide an energy correlator in which temperature or other environmental conditions have little or no effect on the accuracy or operation of the device.

These objects are accomplished in the energy correlator of the present invention by providing slitted tapes which repeatedly scan a focal plane, in which the radiant energy source to be tracked is located. The slits pass the light to a photodetector which produces output pulses in response to receiving light through the scanning slits. The time of occurrence of the output pulses of the photodetector will represent the position of the energy source in the focal plane.

Other objects and advantages of the present invention will become apparent to one skilled in the art when referred to the following description and drawings, wherein.

Figure 1:
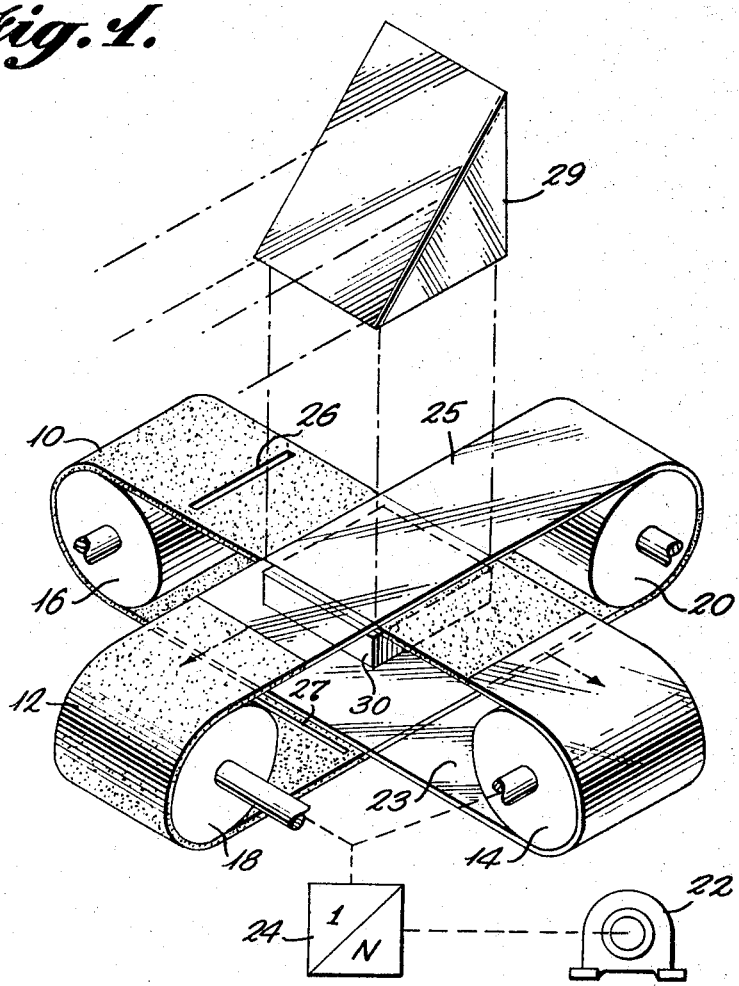
FIGURE 1 is a schematic illustration of the mechanical portion of the correlator of the present invention.

Referring initially to FIGURE 1, there is disclosed a Y-tape 10 and an X-tape 12 which are in the form of endless belts carried by drums 14 and 16, and drums 18 and 20, respectively. Drum 14 of the Y-tape 10 and drum 18 of the X-tape 20 both are driven by synchronous motor 22 through speed reduction unit 24.

Figure 2:
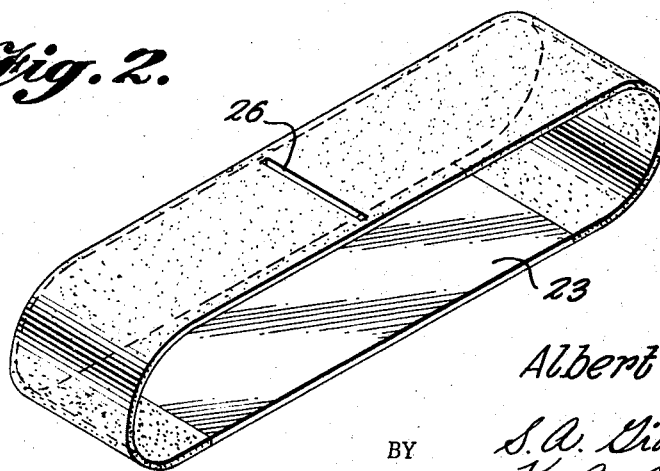
FIGURE 2 shows in detail a tape defining a scanning slit used in the system of FIGURE 1.

The tapes 10 and 12 are identical and have transparent sections 23 and 25 respectively with the remainder of the tapes being opaque. A transparent slit 26 is defined in the opaque section of the Y-tape 10 extending transversely across the tape perpendicularly to the direction of tape travel. This structure is best seen in FIGURE 2, which shows the tape 10 in detail. Similarly, a transparent slit 27 is defined in the opaque portion of the X-tape 12 extending transversely across the tape perpendicularly to the direction of tape travel. The tapes 10 and 12 are disposed at right angles to one another and the Y-tape 10 passes through the X-tape 12. Collimated light from the source to be tracked is directed at the intersection of the two tapes by a prism 29. In this manner, a focal plane is produced where the collimated light impinges upon the intersecting tapes and the two tapes pass through or just beneath this focal plane. In this focal plane the light source to be tracked appears as a point of light. A photodetector 30 is positioned within the endless belts formed by the tapes just below the focal plane where the collimated light impinges upon the tapes. The photodetector is adapted to detect light from the collimated source passing through the intersecting tapes interposed between the collimated source and the detector. The tapes 10 and 12 are positioned on the drums so that when the transparent slit in one tape is passing through the focal plane the transparent section of the other tape will be passing through the focal plane. In this manner the light falling upon the photodetector is controlled solely by the transparent slits 26 and 27. The tapes 10 and 12 are of equal length and their relative positioning is maintained by driving them at the same speed. If different length tapes are used, the relative speeds of the tapes must be adjusted to maintain the necessary positioning.

As a result of the arrangement of the tapes, the slits 26 and 27 alternately scan the focal plane containing the point of light with the slit 26 in the Y-tape 10 passing through the focal plane in one direction and the slit 27 in the X-tape 12 passing through the focal plane in a direction at right angles to the direction of motion of the slit 26. When the slit 26 passes through the point of light in the focal plane, the light will pass through the slit and through the transparent section 23 of the Y-tape 10 to the photodetector, which thereupon produces an output pulse. Thus, each time the slit 26 or the slit 27 passes through the focal plane, the photodetector will produce an output pulse, the time of occurrence of which relative to the tape cycles will depend upon the position of the point of light in the focal plane. The time of occurrence of pulse produced by the action of the slit 26 will depend upon the displacement of the point of light in a direction parallel to the direction of motion of the Y-tape and will represent the Y coordinates of the position of the point of light in the focal plane. The time of occurrence of the pulse produced by the action of the slit 27 will depend upon the displacement of the point of light in the focal plane in a direction parallel to the direction of motion of the X-tape and will represent the X-coordinates of the point of light.

Figure 3:
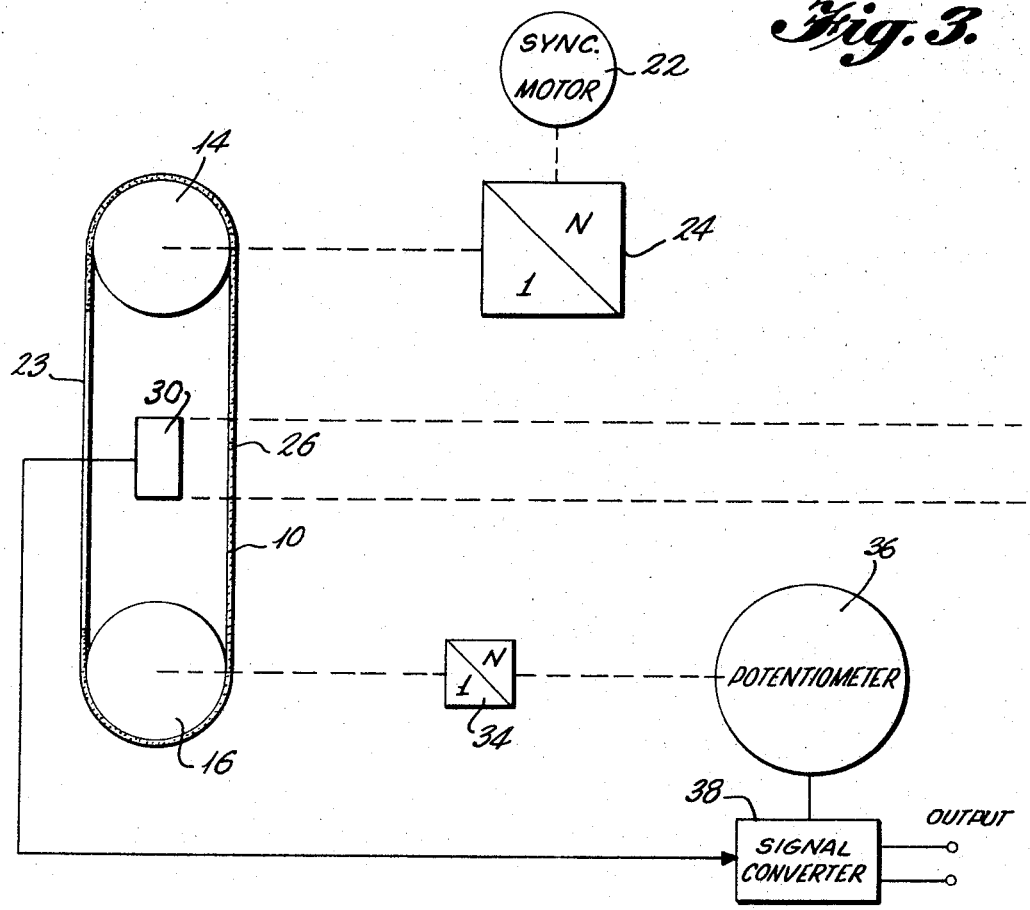
FIGURE 3 is a schematic diagram illustrating the system for detecting displacement along one axis.

FIGURE 3 illustrates just the Y-unit of the system with the X-unit having been omitted for the sake of simplicity. As shown in this figure, the lower tape support drum 16 is connected through a speed increasing unit 34 to the input shift of a potentiometer 36, the output of which is fed into a signal converter 38. Also fed to signal converter 38 are the output pulses produced by the photoelectric detector 30. The signal converter 38 converts the applied pulse signals, which represent the Y coordinates of the point of light in the focal plane by the time of occurrence of the pulses, to pulses which represent the Y coordinates of the point of light by pulse amplitude and polarity. The operation of the converter will be described below in detail with reference to FIGURE 4. The output of the signal converter 38 may be connected to a servo-mechanism or the Y-input of an X-Y recorder, depending upon the use to which the energy correlator of the present invention is put. Multiple outputs may be provided to implement several schemes when required.

Figure 4:
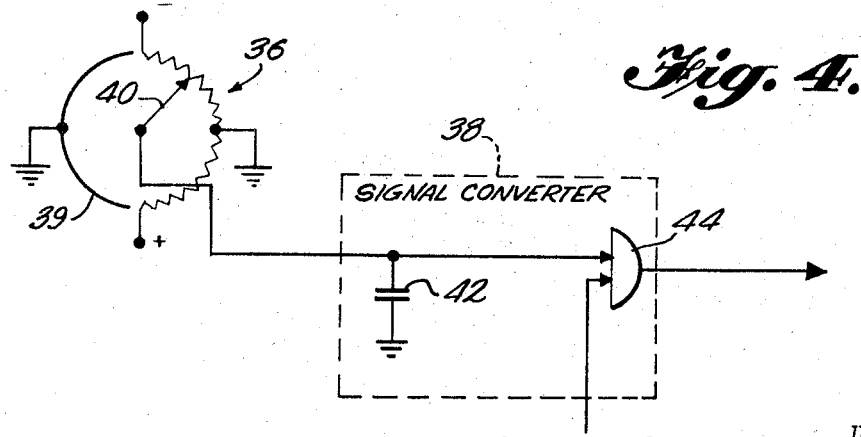
FIGURE 4 is a circuit diagram of portions of the system shown in FIGURE 3.

The operation of the signal converter 38 can be more clearly understood by reference to FIGURE 4. The potentiometer 36 is center tapped to ground with a positive DC voltage applied 90° clockwise and a negative DC voltage being applied 90° counter-clockwise from the center tap. The other 180° of the potentiometer designated by the reference number 39 is separated from the 90° points and is shorted to ground so that no signal may be obtained while movable tap 40 of the potentiometer is in contact with this portion of the potentiometer. The signal converter comprises a capacitor 42, one plate of which is connected to ground. The other plate of the capacitor is connected to the movable tap 40 and to a gating device 44, which also receives the output pulses from the photoelectric detector 30. The speed increasing unit 34 drives the movable tap 40 of the potentiometer 36 in synchronism with the tape 10 so that while the slit 26 is moving through the focal plane, the movable tap will be moving over the unshorted portion of the potentiometer and will be at the center tap of the potentiometer when the slit 26 is at the middle of the focal plane. Thus, the voltage produced at the potentiometer and across the capacitor 42 will vary with the motion of the slit 26 through the focal plane. When the slit passes through the point of light, the photodetector will apply a pulse to the gate 44 and the voltage across the capacitor will pass through the gate 44 as an output pulse. This output pulse will have an amplitude and polarity representing the Y-coordinates of the point of light. The amplitude of the output pulse will indicate the magnitude of the displacement of the point of light from the center of the focal plane along the Y-coordinates and the polarity of the output pulse will represent the direction of the displacement. If the point of light is at the center of the focal plane, the amplitude of the output pulse will be zero. The sychronism of the potentiometer 36 with tape 10 is arranged so that the movable tap 40 will be on the shorted out portion of the potentiometer while the slit 27 of the X-tape passes through the focal plane. In this manner the pulse produced by the action of the slit 27 in the X-tape is prevented from causing an output from the converter 38.

Amplitude modulated output pulses are derived from the X-tape in the same manner that they are derived from the Y-tape with an additional potentiometer connected to be driven by the drum 20 and a signal converter connected to receive the output pulses of the photodetector and the output potentiometer.

Because the two tapes and the potentiometer are all driven from a common source velocity fluctuation of the source speed will not affect the accuracy of the output.

If it is desired to servo a telescope system to follow a satellite or similar object, the energy correlator will be mounted across the aperture of a telescope so that the object to be followed is focused on the intersection of the two tapes over the photodetector 30 to thus generate on the intersecting tapes a focal place containing the object to be tracked as a point of light. The signal converters will then produce output pulses having amplitude and polarities representing the X and Y coordinates of the point of light in the focal plane. These signals can then be used to control a servomechanism drive to drive the telescope until the point of light representing the object being tracked is in the center of the focal plane whereupon amplitude of the output pulses from the converters will be zero. In this manner, the telescope will automatically track the object. In this system the light point in focal plane is generated optically. Another useful method of generating the light point in the focal plane is by means of a cathode ray tube.

The exact width of the slit in the tape is not of critical importance to the present invention. This is so since the energy correlator completes the scan of the whole area in one simple motion by the movement of the tape containing the slit therein across the face of the photoelectric detector. This is in contrast with devices of the prior art in which the slit width and shape is an important factor in acquiring and holding a target because the scanning is not performed in a single motion.

While it will be apparent to those skilled in the art that the embodiments of the invention herein disclosed are well calculated to fulfill the objects of the invention, it will be appreciated that the invention is susceptible to modification, variation and change without departing from the proper scope or fair meaning of the appended claims.

What is claimed is:

1. In an energy correlator including an opaque endless belt means defining a transparent slit, means for driving said opaque belt means repeatedly through a focal plane, and means to detect radiant energy passing through said slit while said slit is passing through said focal plane, the improvement therein wherein said detecting means produces output pulses, the time of occurrence of which represent the position of the energy source in said focal plane, and wherein said energy correlator further includes means responsive to the output pulses of said detector means to produce amplitude modulated pulses representing the position of said energy source in said focal plane.

2. An energy correlator as recited in claim 1 wherein said means to produce amplitude modulated pulses comprises a potentiometer, means to drive the movable tap of said potentiometer in synchronism with said belt means, and means to produce an output pulse having an amplitude corresponding to the voltage on said movable tap in response to and at the time of the output pulses of said detector means.

3. An energy correlator comprising two endless belts, one of said belts extending at right angles to the other of said belts, each of said belts having a transparent slit therein and a transparent section, means for continuously driving said belts past a focal plane so as to maintain said belts with relative positions such that when the transparent slit in each of said belts passes said focal plane, the transparent section of the other of said belts passes said focal plane simultaneously therewith, and detector means for detecting radiant energy emanating from said focal plane through said slits.

4. An energy correlator as recited in claim 3 wherein said detecting means produces output pulses the time of occurrence of which represent the position of said energy source in said focal plane, and wherein said energy correlator further comprises means responsive to the output pulses of said detector means to produce amplitude modulated pulses representing the position of said energy source in said focal plane.

5. An energy correlator as recited in claim 3 wherein said means for continuously driving said belts comprises a single motor for both of said belts.

6. An energy correlator as recited in claim 4 wherein said means to produce amplitude modulated pulses comprises a first potentiometer, means to drive the movable tap of said first potentiometer in synchronism with a first one of said endless belts, a second potentiometer, means to drive the movable tap of said second potentiometer in synchronism with the other one of said endless belts, and means to produce an output pulse having an amplitude corresponding to the amplitude of the voltage on the movable tap of said first potentiometer at the time of and in response to each output pulse produced by said detector means in response to the action of the slit in said first one of said endless belts, and means to produce an output pulse having the amplitude of the voltage on the movable tap of said second potentiometer in response to and at the time of each output pulse of said detector means produced in response to the action of the slit in said other one of said endless belts.

References Cited

UNITED STATES PATENTS

| | | | |
|---|---|---|---|
| 2,489,305 | 11/1949 | McLennan | 250—202 |
| 2,772,479 | 12/1956 | Doyle | 33—46.5 |
| 3,159,778 | 12/1964 | Gavreau | 250—202 X |
| 3,322,953 | 5/1967 | Zuckerbraun | 250—203 |

JAMES W. LAWRENCE, *Primary Examiner.*

E. R. LA ROCHE, *Assistant Examiner.*

U.S. Cl. X.R.

88—1; 250—232, 237